Figure 1:
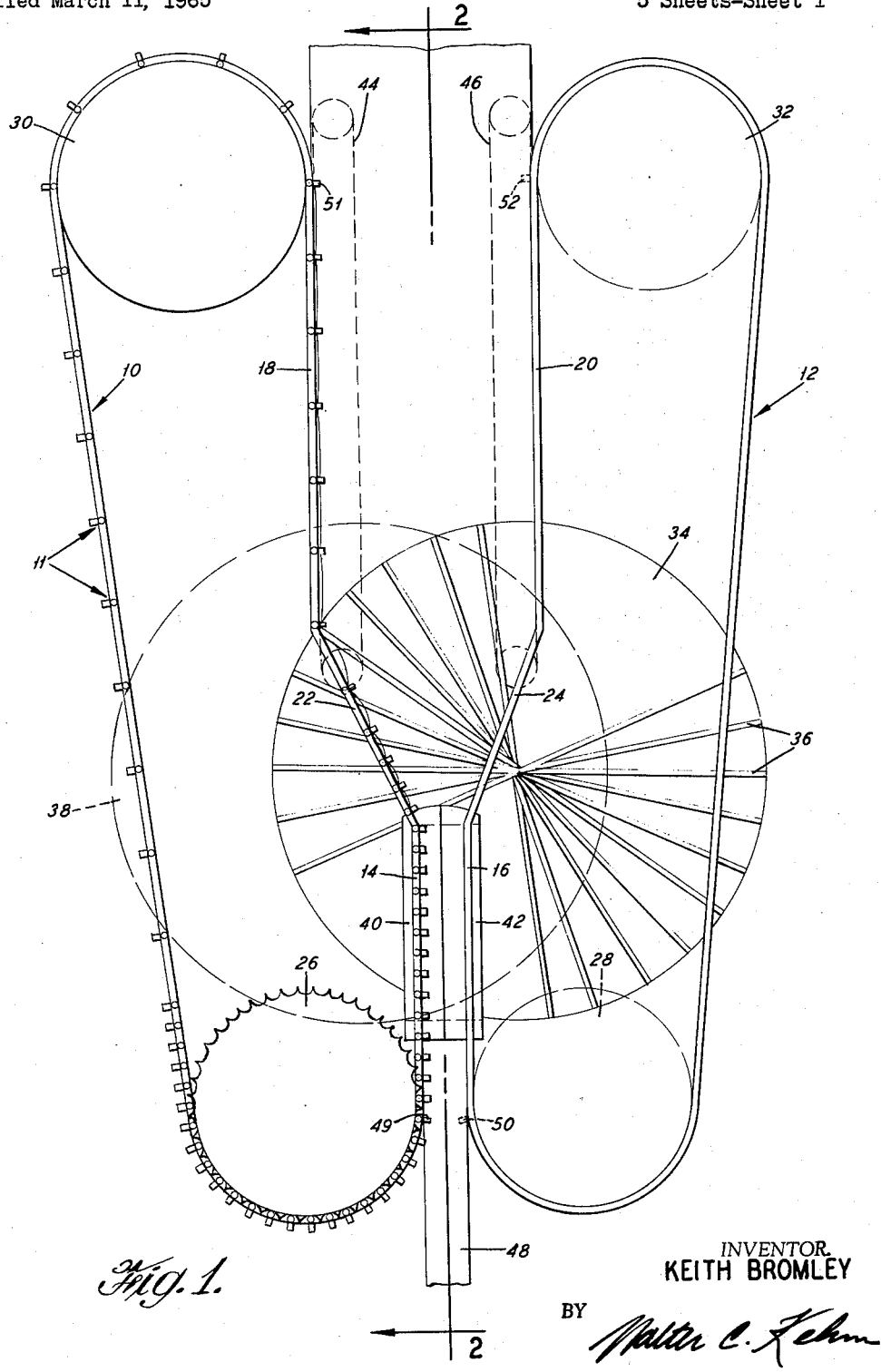

April 26, 1966 K. BROMLEY 3,247,544
APPARATUS FOR STRETCHING SHEET MATERIALS
Filed March 11, 1965 5 Sheets-Sheet 1

INVENTOR.
KEITH BROMLEY
BY
*Walter C. Kehm*
ATTORNEY

April 26, 1966 K. BROMLEY 3,247,544
APPARATUS FOR STRETCHING SHEET MATERIALS
Filed March 11, 1965 5 Sheets-Sheet 2
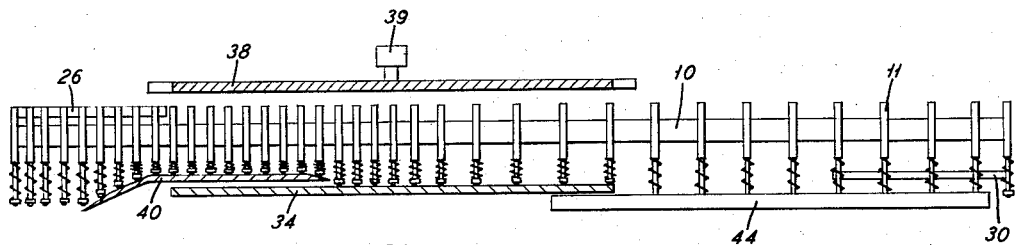
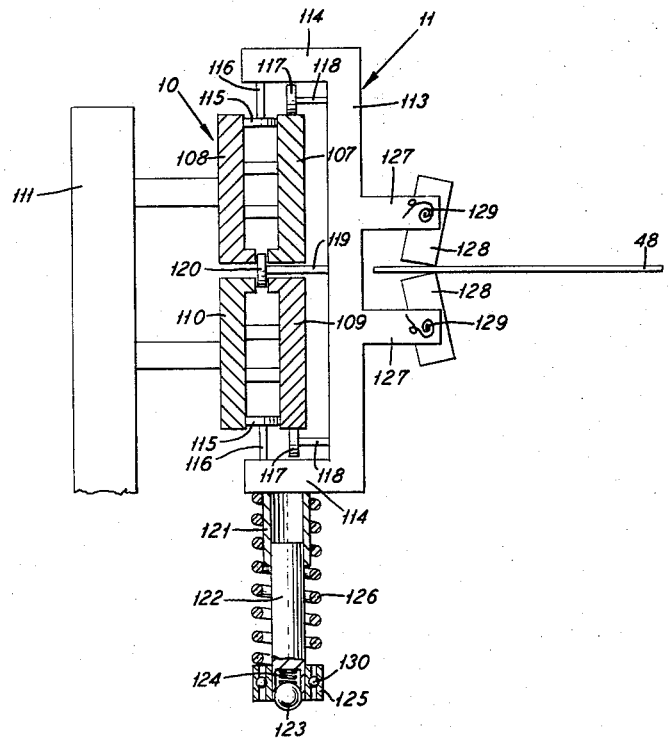
INVENTOR.
KEITH BROMLEY
BY
ATTORNEY

INVENTOR.
KEITH BROMLEY
BY
ATTORNEY

INVENTOR.
KEITH BROMLEY
BY
ATTORNEY

United States Patent Office 3,247,544
Patented Apr. 26, 1966

3,247,544
APPARATUS FOR STRETCHING SHEET
MATERIALS
Keith Bromley, Lawford, England, assignor, by mesne
assignments, to Bakelite Xylonite Limited, a corporation of Great Britain
Filed Mar. 11, 1965, Ser. No. 439,005
9 Claims. (Cl. 18—1)

This invention relates to apparatus for stretching sheet material, including polymeric sheet materials such as plastic film.

It is well known that the physical properties of some sheet materials, especially some polymeric sheet materials, can be improved by stretching the sheet material in the plane of the sheet. The stretching may be effected in one direction only (which is commonly referred to an uniaxial stretching) or in two mutually perpendicular directions (which is commonly referred to as biaxially stretching). In this way a number of properties, for example, the tensile strength and the toughness of the material can be improved.

It has previously been proposed to provide apparatus in which the sheet material is held by grippers which are caused to move along divergent paths and simultaneously accelerated along these paths, for example, by U.S.P. 2,618,012 to D. T. Milne issued November 18, 1952 or U.S.P. 2,923,966 to W. R. Tooke, Jr., et al. issued February 9, 1960. Such devices have generally employed rather complex stretching means including endless belts or chains driven at varying speeds. These stretching means have borne all the tension and friction attendant in stretching sheet material with resultant wear and break down of the component parts thereof. There is thus a need and a market for an apparatus for stretching sheet material that substantially overcomes such difficulties. Accordingly, it is an object of this invention to provide a relatively simple and durable apparatus for biaxially stretching sheet material.

These and other objects are accomplished in the present invention which provides apparatus for effecting the simultaneous biaxial stretching of sheet material, comprising two sets of movable grippers, one set for gripping one of two opposing marginal portions of the sheet material and the other set for gripping the other of the marginal portions of the sheet material and each gripper having a projecting portion for engagement with driving means, means for causing the grippers to grip the marginal portions before the material enters a stretching zone and means for causing the grippers to release the marginal portions after the material has passed through the stretching zone, spaced guide means for each set of grippers arranged to constrain the grippers, while they are gripping the sheet material, to move along paths which diverge over at least a part of their length, two driving means, associated one with each set of grippers and each including a rotatable member formed with a plurality of generally coplanar ridges or grooves for engaging the projecting portions substantially of the grippers, the plane of the ridges or grooves being normal to the axis of rotation of the rotatable member and the ridges or grooves extending outwardly from points near the said axis to terminate at their outer ends on a circle centered on the said axis, the ridges or grooves being equally spaced around the said axis, means for bringing the grippers of each set into engagement with the associated driving means singly and at a given point along the path corresponding to the point of engagement on the other path, the arrangement being such that, on rotation of the rotatable members, any gripper that is in engagement with a bridge or groove is caused to move outwardly along the ridge or groove and thus along its path and that, over at least a part of the portion of its path that diverges from the path of the other set of grippers, the gripper is accelerated along its path, and means for moving the grippers along their paths after they have come out of engagement with the driving means.

Figure 8:
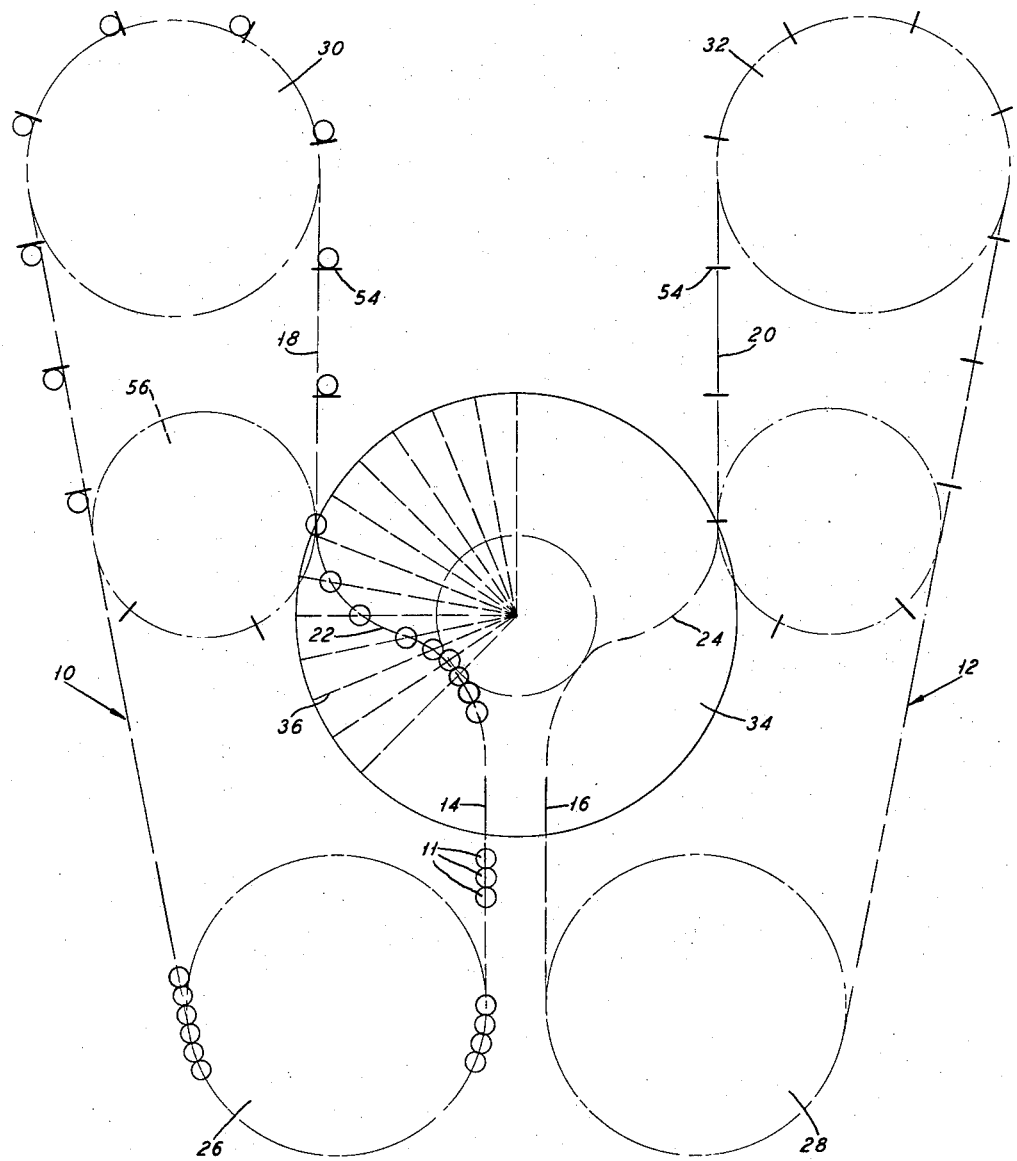
Figure 9:
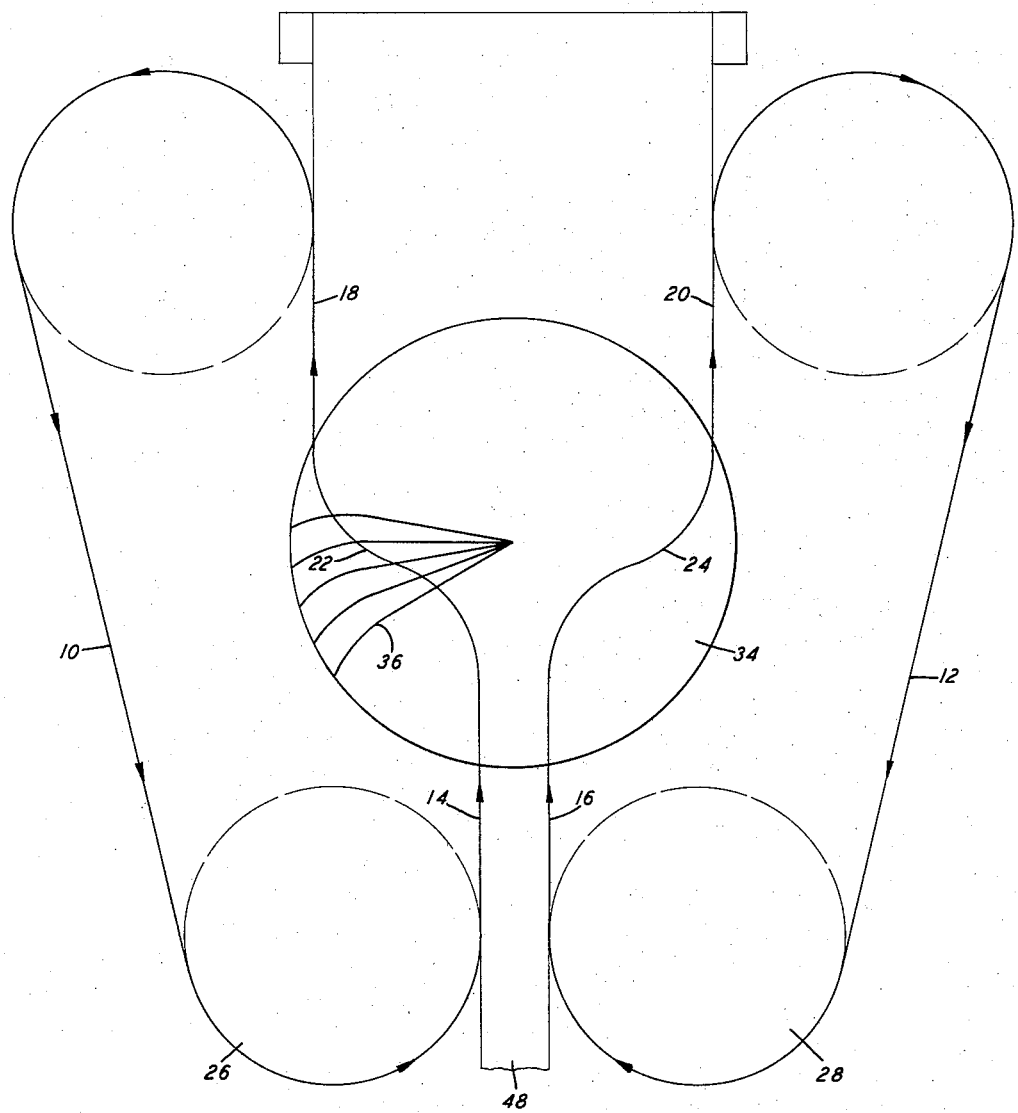

Several forms of the apparatus in accordance with the invention will now be described in greater detail, by way of example, with reference to the accompanying drawings, in which:

FIG. 1 is a plan view of one form of the apparatus;
FIG. 2 is a section taken on the line 2—2 of FIG. 1;
FIG. 3 is a side elevation of a gripper on a larger scale;
FIGS. 4, 5, 6 and 7 are representations of several different forms of a rotatable member; and
FIGS. 8 and 9 are diagrammatic representations of two further forms of the apparatus.

The apparatus as illustrated in FIGS. 1 and 2 comprises two spaced coplanar guide means 10 and 12 in the form of closed loops, which are elongated in the direction of the line 2—2 and symmetrically disposed on opposite sides thereof and are made up of side portions joined at the ends by substantially semi-circular portions. The sides of the loops nearest to the line 2—2 terminate, at either end, in portions 14, 16 18 and 20 which are parallel to one another and to the line 2—2, the distance between the portions 18 and 20 being greater than the distance between the portions 14 and 16 and the portions 14 and 18 and portions 16 and 20 are joined respectively by portions 22 and 24 which diverge from the line 2—2 and from each other.

Two star wheels or gears 26 and 28 are mounted coaxially with the semi-circular portions of the guide means at the same end of the loops as the portions 14 and 16 and are located one above and one below the level of the semi-circular portions. The diameter of each star wheel is substantially the same as the diameter of the adjacent semi-circular portion of the guide means.

A rubber-rimmed wheel 30 is mounted coaxially with, and below the level of, the semi-circular portion of the guide means 10 at the opposite end of the loop to the star wheel 26 (which is above the associated guide means 10) and has a diameter substantially equal to the internal diameter of the semi-circular portion. A second rubber-rimmed wheel 32 is mounted coaxially with, and above the level of, the semi-circular portion of the guide means 12 at the opposite end of the loop to the star wheel 28 and has a diameter substantially equal to the internal diameter of the semi-circular portions.

As can be seen from FIG. 3, each guide means 10 (or 12) is made up of four rails 107, 108, 109 and 110 of which the rails 107 and 108 are connected together and the rails 109 and 110 are similarly connected together, the two pairs of rails being mounted on a member 111, one above the other.

Mounted on the guide means 10 and 12 are two sets of movable grippers, one set for each guide means which are designated generally by the reference numeral 11 and which comprise a body portion which is generally C shaped and made up from a vertical member 113 and two horizontal members 114. A wheel 115 is mounted for rotation on a vertical axle 116 and one such axle is attached to each of the members 114 in such a way that the wheel 115 on the upper member 114 fits in the space between the rails 107 and 108 and the wheel 115 on the lower member 107 fits in the space between the rails 109 and 110. Two further wheels 117 are mounted on horizontal axles 118 which are connected to the vertical member 113 towards the ends thereof in such a way that the wheel 117 towards the upper end of the member 113 runs on the top of the rail 107 and the wheel 117 towards the lower end of the member 113 runs on the bottom of the rail 109. An arm 119 extends from the rear of the member 113 and carries, at its rear end, a runner 120 which runs in the space between the rails 107, 108, 109, and 110.

Attached to the bottom of the lower member 114 is a sleeve 121 in which there is slidably mounted a pin 122. The end of the pin 122 remote from the member 114 is recessed to receive and retain a ball 123, which is urged outwardly by a coil spring 124. Mounted coaxially with the pin 122 at the end remote from the member 114 is a roller bearing 125 and a coil spring 126 is wound round the pin 122 and sleeve 121 and seats at one end against the member 114 and at the other end on the bearing 125.

On the side of the member 113 remote from the rails 107–110, are two arms 127 on each of which is pivotably mounted a finger 128. The fingers 128 can come together to grip the material to be stretched and are urged towards their gripping position by springs 129.

The grippers 11 that run on guide means 10 are mounted in the position shown in FIG. 3, that is to say, the pins 122 extend downwardly, and the grippers 11 that run on guide means 12 are mounted in the position shown if FIG. 3 is viewed upside down, that is to say, the pins 122 extend upwardly.

Referring again to FIGS. 1 and 2, a rotatable wheel 34 having radially extending raised ribs 36 is mounted on drive means 35 and located below the plane of the guide means 10 and a similar rotatable wheel 38 having radially extending raised ribs (not shown) is mounted on drive means 39 and located above the plane of the guide means 12, the two ribbed surfaces of the wheels 34 and 38 facing inwardly towards the guide means 10 and 12 and the planes of wheels 34 and 38 being parallel to the plane of the guide means 10 and 12.

A platform 40 extends below the portion 14 of the guide means 10 and above the ribbed surface of the wheel 34 from a point outside the circumference of the wheel 34 to the point at which the divergent portion 22 of the guide means 10 starts, at which point the guide means 10 extends in a direction which is perpendicular to the radii of the wheel 34. A similar platform 42 extends above the guide means 12 and below the ribbed surface of the wheel 38 from a point outside the circumference of the wheel 38 to the point at which the divergent portion 24 of the guide means 12 starts, at which point the guide means 12 extends in a direction which is perpendicular to the radii of the wheel 38. The upper surface of each end portion of the platform 40 and 42 is inclined so that the grippers can run onto the platforms 40 and 42 more easily and the projections on the grippers are lowered onto the surfaces of the wheels 34 and 38 gradually.

An endless belt 44, the plane of which is perpendicular to the plane of the sheet material, runs below the portion 18 of guide means 10 and extends from a point below the wheel 34 to a point beyond the rubber-rimmed wheel 30. A second endless belt 46 runs above the portion 20 of the guide means 12 and extends from a point above the wheel 38 to a point beyond the rubber-rimmed wheel 32. The direction of movement of the surface of the belts 44 and 46 nearest to the guide means 10 and 12 is the same as the direction of movement of the sheet material through the apparatus.

If desired, that part of the apparatus which comprises the wheels 34 and 38 and the divergent portions 22 and 24 of the guide means 10 and 12 may be enclosed within an oven (not shown) and an annealing zone and/or a cooling zone may be provided at the end of the divergent portions 22 and 24 of the guide means 10 and 12.

In operation, a web of sheet material 48 is fed from a feed roll (not shown) and is gripped by the grippers 11 at the points 49 and 50. The grippers are opened and closed to allow them to grip the sheet material by cam means (not shown) on the star wheels 26 and 28. The grippers 11 are passed along the guide means 10 and 12 by other grippers that are fed round behind them by the action of the star wheels 26 and 28 and run along the platforms 40 and 42. While the grippers 11 are in contact with the platforms 40 and 42 the springs 126 are compressed inwardly so that when the grippers 11 reach the ends of the platforms 40 and 42 the pins 122 spring outwardly to contact the wheels 34 and 38 at a point between two ribs such as ribs 36 of wheel 34. Each gripper 11 is engaged for example by a rib 36 and is hurled outwardly along the divergent portion 22 of its associated guide means 10 at an ever increasingly velocity. When the grippers 11 reach the edge of the wheels 34 and 38 they fly off and are picked up by the endless belts 44 and 46 which carry them along the portions 18 and 20 towards the rubber-rimmed wheels 30 and 32. The grippers 11 release the sheet material 48 at the points 51 and 52 and are opened at that point by cam means (not shown) associated with the wheels 30 and 32. The clearance between the rubber-rimmed wheels 30 and 32 and the guide means 10 and 12 is such that the grippers 11 are forced against the wheels 30 and 32 and are therefore carried round the semi-circular portions of the guide means 10 and 12 by the rotation of the wheels 30 and 32. The grippers 11 are then returned to the star wheels 26 and 28 to begin another circuit.

In the apparatus shown in FIGS. 1 and 2, the guide means 10 and 12 are inclined so that the rubber-rimmed wheels 30 and 32 are at a higher level than the star wheels 26 and 28 so that when the grippers 11 come out of engagement with the wheels 30 and 32 they fall under the influence of gravity back towards the star wheels 26 and 28.

In the apparatus shown in FIGS. 1 and 2, the ribs on the wheels 34 and 38 are straight and radial but they may have other shapes, as is shown in FIGS. 4 to 7, depending on the velocity-time relationship desired for the grippers. In FIGS. 4 to 7 the wheel is designated by the number 34 but is meant to illustrate embodiment of both wheels, 34 and 38.

Figure 4:
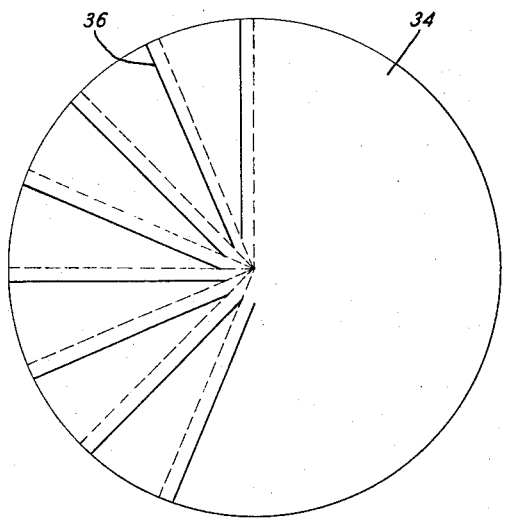

FIG. 4 shows a preferred form of wheel 34 in which the ribs 36 are offset from the radii of the wheel 34 so that the paths of the centre of the pin 122 of each gripper 11 remains on a radius of the wheel 34 as that gripper proceeds along its guide means 10.

Figure 5:
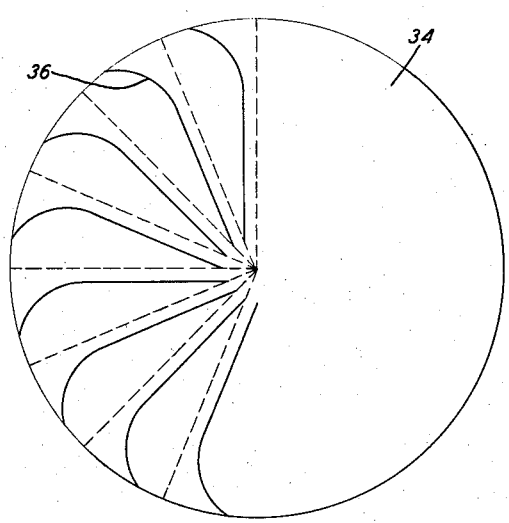

FIG. 5 shows a third form of wheel 34, in which the ribs 36 have much the same form as those shown in FIG. 4, except that at their outer ends they curve away from the radii of the wheel 34. In this case, the acceleration curve of the grippers 11 flattens out as the grippers 11 approach the circumference of the wheel 34. This has the advantage that the change in acceleration as the grippers 11 leave the wheel 34 is reduced.

Figure 6:
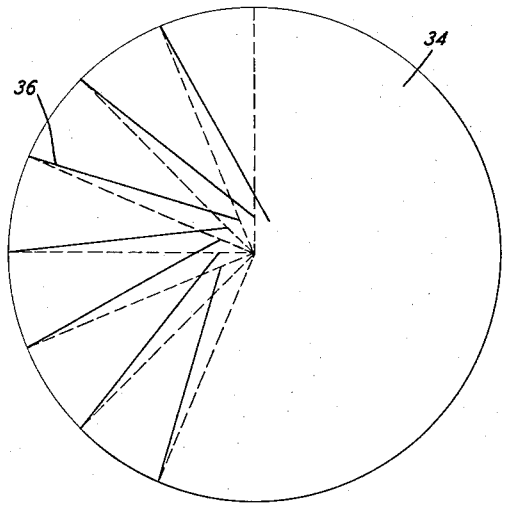

FIG. 6 shows a fourth form of wheel 34, in which the ribs 36 lie on non-radial chords of the wheel 34 and, in this case, the acceleration curve of the grippers 11, although being of the same general shape as the acceleration curve of the grippers accelerated by the wheels 34 shown in FIG. 1, is flatter.

Figure 7:
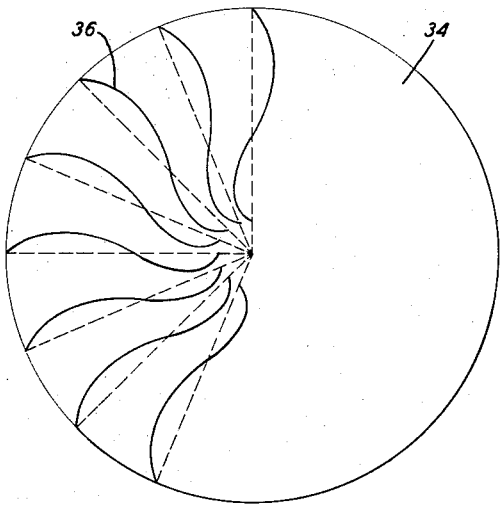

FIG. 7 shows a fifth form of wheel 34, in which the ribs 36 initially diverge from the radii of the wheel 34, then curve round to cross the radii and finally again curve round towards the circumference of the wheel 34. When a wheel 34 of this form is used in the apparatus the velocity-time curve tends towards a straight line, provided the grippers first contact the wheels 34a at a point after the ribs 36 have started to curve round to cross the radii of the wheel 34.

The forms of wheel 34 shown in FIGS. 4 to 7 can be used to replace the wheels 34 and 38 shown in FIGS. 1 and 2, the rest of the apparatus remaining the same. Both wheels used in the apparatus however, must be of the same form.

Referring to FIG. 8, this form of the apparatus is the same as that shown in FIGS. 1 and 2 except that the portions 22 and 24 of the guide means 10 and 12 instead of being straight as in FIG. 1 are curved. This has the effect of straightening-out the velocity-time curve of the grippers and tending to produce a more linear acceleration. This form of the apparatus also includes means for returning the grippers to the star-wheels 26 and 28 which comprises an endless chain having means 54 which engage with the grippers as they leave the wheels 34 and 38. The chain is driven by wheels 56 and the wheels 30 and 32. A similar arrangement may be used in the form of apparatus shown in FIG. 1.

The form of apparatus shown in FIG. 9 is the same as that shown in FIG. 8 except that the wheels 34 and 38 are of the form shown in FIG. 5. As with this form of wheel the acceleration imparted to the grippers decreases as the grippers approach the circumference of the wheels 34 and 38, thus flattening-out the velocity-time curve for the grippers, in this form of the apparatus the acceleration tends to be linear until near the circumference of the wheels 34 and 38 where it gradually decreases.

In operation, the grippers of each set are caused to grip the marginal portions of the sheet material and are then brought into engagement with the ridges or grooves at such a point along the guide means that the grippers, while in engagement with the ridges or grooves are never subjected to a negative acceleration. Advantageously, the point of engagement is a point where the guide means extends in a direction that is perpendicular to the radius of the rotatable member passing through that point because at such a position the initial velocity of the gripper will be a minimum. When a gripper is engaged by a ridge or groove, the ridge or groove tries to carry the gripper round with it. As the gripper is only capable of movement along its guide means, however, the action of the ridge or groove is to force the gripper to move along its guide means. The gripper thus contacts successive parts of the ridge or groove which are at an increasing distance from the axis of the rotatable member and which therefore have an increasing linear velocity. Provided that the divergent portion of the guide means is not curved, the velocity of a gripper at any point along the divergent portion of its path, while it is in engagement with a ridge or groove, is dependent on the angle $\phi$ subtended by a line drawn from that point to the axis and a line drawn from the axis through the point of closest approach of the divergent portion of the guide means (projected if necessary) to the axis and the closest distance $r$ of approach of the divergent portion of the guide means (projected if necessary) to the axis of the rotatable member, and is equal to $$\frac{rw}{\cos^2\phi}$$

where $w$ is the angular velocity of the rotatable member. The distance $r$ has, for the sake of convenience, been taken as the distance of closest approach of the divergent portion of the guide means (projected if necessary) to the axis of the rotatable member and this in fact is true if the guide means is regarded as a line and the gripper as a point on the line. In practice, of course, the distance $r$ will not actually be the distance defined above but will in fact be the closest distance of approach of the locus of the points of contact of the projecting portions of the grippers with the ridges or grooves (projected if necessary) to the axis of the rotatable member.

For most practical purposes the projection of the layout of the guide means and rotatable members on the plane of the sheet material can be symmetrical about the longitudinal axis of the sheet material in the stretching zone so that the velocities of the grippers are (assuming that the rotatable members are driven at the same angular velocity) the same at corresponding points (that is to say, points that are joined by lines extending at right angles to the axis of the sheet material) along the two guide means.

The ridges or grooves may be straight and may be substantially radial, when they are advantageously so positioned that the centre of the projecting portion of each gripper remains on the same radius of the rotatable member as that gripper proceeds along the guide means. Instead, the ridges or grooves may extend along non-radial chords.

If it is desired to vary the velocity-time relationship of the grippers from that given by straight ridges or grooves, the ridges or grooves may, along at least a part of their length, be curved. Either instead of or in addition to this expedient, the divergent portions of the guide means may be curved.

The driving means are advantageously located one on either side of the guide means, but they may both be located on the same side of the guide means in cases where the consequent restriction on the size and placing of the rotatable members are acceptable. When the driving means are located on either side of the guide means the grippers running on one guide means will be inverted relative to the grippers running on the other guide means but will otherwise be the same. Alternatively, the projecting portion of the grippers on one of the guide means may be formed on the end opposite to the ends on which it is formed on the grippers on the other guide means.

It is generally desirable that the arrangement should be such that, during stretching, the grippers gripping one marginal portion of the sheet material should be directly opposite the grippers gripping the other marginal portion, that is to say, the grippers of the two sets should be at corresponding points along their respective guide means.

In order to ensure that, in operation, the two rotatable members have the same angular velocity they are preferably positively coupled together.

The guide means can comprise a single rail or a pair of parallel rails and the grippers can be slidably mounted on the guide means. Advantageously, the grippers are provided with rollers or wheels to reduce friction to a minimum while still maintaining a good stability of the grippers. The grippers can be any conventional sheet gripping means adapted to be mounted on the above guide means, for example, tenter clips.

The projecting portions of the grippers, which engage the ridges or grooves on the rotatable members and move along them, are advantageously each provided with friction reducing means, which preferably include a member that is rotatably mounted on the gripper, for example, using roller or ball bearings, and is arranged to roll over the surface of the ridges or grooves. Further, if the grippers are arranged to run over the surfaces of the rotatable members between the ridges or grooves the projecting portions of the grippers are advantageously provided with friction-reducing means. These may, for example, take the form of a freely rotatable ball or a wheel arranged to form a caster.

The guide means for each set of grippers advantageously forms a closed path so that the grippers, after releasing the sheet at the end of the stretching zone can be led back to their starting point where they can grip a fresh marginal portion of the sheet material and again pass through the stretching zone. Advantageously, at the point where the grippers first grip the marginal portions the guide means run parallel to one another for a short distance. The guide means then diverge to provide divergent portions of the paths of the grippers and then, at the end of the stretching zone, advantageously run parallel to one another again before turning to complete their closed paths. Instead, beyond the end of the stretching zone, the guide means may converge slightly to allow a small degree of shrinkage during annealing. The divergent portions of the guide means advantageously start at the point where the grippers are engaged by the ridges or grooves, so that the period during which all the stretch in the transverse direction is put in is coterminous with the period during which all the stretch in the longitudinal direction is put in. This, however, is not essential and, if it is desired to stretch the material in either the transverse or the longitudinal direction before stretching it in both directions simultaneously, the divergent portions may start either before or after the point at which the grippers are first engaged by the driving means. Similarly, the divergent portions advantageously terminate at the point where the grippers leave the driving means, but again this is not essential and they may terminate either before or after that point.

The grippers must be fed to the surface of the rotatable members positively. Advantageously, the feeding means for each set of grippers is arranged to cause the grippers themselves to push one another along the guide means to bring them to the point at which they come into engagement with the ridges or grooves. Thus, for example, each feeding means may comprise a rotatable star-wheel, which is able to pick up the grippers between its teeth as the grippers return from the end of the stretching zone and to carry them round with it at definitely spaced intervals. The rate at which the grippers are fed to the point of engagement with the ridges or grooves on the associated rotatable member is determined by the rate of rotation of the rotatable member and, advantageously, each star-wheel is so positively coupled to its associated rotatable member as to ensure that, immediately before it is engaged by a ridge or groove, each gripper is moving at a velocity which is equal to the component of velocity along the guide means of the point of the ridge or groove which it is to contact upon engagement.

Alternatively, the means for feeding the grippers to the rotatable members, instead of comprising a star-wheel, may comprise a chain conveyor or similar device having means, arranged at equal intervals along the conveyor or similar device, for engaging and releasing the grippers. In this case, too, it is desirable that each feeding means should be positively coupled to its associated rotatable member.

Advantageously, each guide means is so arranged that, at least in the region of the associated rotatable member, the path defined by the guide means extends in a direction at right angles to the axis of the associated rotatable member, the projecting portion of each gripper is movable relatively to the remainder of the gripper between an inoperative position and an operative position, and the feeding means is arranged to ensure that the projecting portion of each gripper is in its inoperative position when the gripper enters the said region and to cause the projecting portion to move to its operative position for engagement with a ridge or groove on the rotatable member when the gripper reaches a predetermined point along its path. Each gripper is preferably provided with resilient means arranged to urge the projecting portion of the gripper towards either its inoperative or its operative position. When the resilient means is arranged to urge the projecting portion of the gripper towards its operative position, each feeding means may comprise a platform along which the projecting portions of the associated grippers can run and which maintains the projecting portions in their inoperative positions until, upon reaching the edge of the platform, the resilient means of each gripper moves the projecting portion of the gripper into its operative position. Advantageously, both ends of the platform are chamfered to permit the projecting portions of the grippers to run onto the platform more easily and to reduce the speed at which the projecting portions spring out. When the resilient means is arranged to urge the projecting portion of the gripper towards its inoperative position, each feeding means may comprise cam means arranged to move the projecting portions of the associated grippers to their operative position when the grippers reach the said predetermined point, to maintain the projecting portions in their operative positions at least until the projecting portions have reached a second predetermined point (which will usually be after the projecting portions have reached the outer ends of the ridges or grooves) and to allow the projecting portions to return to their inoperative positions and re-enter the said regions.

Preferably, the projecting portions are slidably mounted in the grippers and the resilient means comprises a coil spring.

The means for moving the grippers after they come out of engagement with the driving means may operate either positively or non-positively, because at the end of the stretching operation the sheet material is highly elastic and slight alterations in the applied stretch can be tolerated. Each such means may, for example, comprise an endless belt in frictional engagement with the grippers and arranged to move them along the guide means. Alternatively, the means may comprise take-up means for the stretched sheet material.

In either case, there is advantageously provided a wheel, for example, a star-wheel, as in the feeding means, or a rubber-rimmed wheel, to carry out the grippers round the turn necessary to complete the circuit of the guide means.

The speed at which the grippers are moved after they come out of engagement with the driving means need not exactly correspond to the speed of the grippers at the end of the stretching operation since, as has been mentioned hereinbefore, the sheet material is highly elastic at the end of the stretching operation. It is, however, desirable that the two speeds should correspond as closely as possible.

The method by which the grippers are returned to the feeding means is immaterial and, for example, if the paths defined by the guide means are so inclined to the horizontal that the point at which the means for moving the grippers after they come out of engagement with the driving means ceases to move the grippers is located at a higher level than the feeding means, the force of gravity may be used. Alternatively, a series of endless belts or other conveying devices may be used.

It is desirable that it should be possible to vary the stretch applied to the sheet material in the longitudinal or the transverse direction or both directions, because different materials require different degrees of stretching in one or both directions, and therefore the guide means are advantageously so arranged as to be movable relative to one another and the rotatable members are advantageously so mounted as to be movable relative to their associated guide means.

Each guide means may be movable as a whole and/or may be so constructed, for example, by including the provision of hinges at the beginning and end of the divergent portions, as to enable the shape of the path to be varied. If the guide means are provided with hinges, this allows the distance between the paths of the grippers at the end of the stretching zone to be altered without altering the distance between the paths of the grippers at the start of the stretching zone. If it is desired not to alter the longitudinal stretch ratio, it is necessary to move the rotatable members relative to their associated guide means to change the distance of closest approach of the guide means to the axis of the rotatable member. When the complete paths followed by the grippers are moved, the ratio of the distance between the paths at the start of the stretching zone to the distance between the paths at the end of the stretching zone will be varied, but the longitudinal stretch ratio can be maintained unaltered by suitable movement of the rotatable members relative to the guide means.

If the rotatable members are moved relative to the guide means without moving the guide means, the degree of longitudinal stretch may be varied without altering the degree of transverse stretch.

By suitable adjustment of the guide means and the rotatable members, it is possible to obtain exceedingly high longitudinal stretch ratios and the apparatus is therefore especially suitable for stretching materials requiring high stretch ratios, for example, polypropylene, which requires a stretch ratio of about 7:1, to attain their optimum properties. It is especially advantageous to stretch such materials rapidly and as, in the apparatus, the stretching zone can be made short, high rates of stretch are possible. Because of its adaptability, however, the apparatus is also suitable for stretching materials which require much lower stretch ratios, for example, polyvinyl chloride and polystyrene.

When high stretch ratios are applied, the grippers, at the end of the stretching operation, are very far apart and a great deal of scalloping of the marginal portions of the sheet material occurs, which results in a large wastage of material; separation of the grippers at the end of the stretching operation, for given longitudinal and transverse stretch ratios, is dependent on the minimum separation of the grippers at the start of the stretching operation and this, in turn, depends on the width of the gripper mountings. The separation of the grippers may be reduced, however, if each guide means is formed as a double track, each of which tracks carried a separate set of grippers, and the grippers of the two sets being arranged alternately along the marginal portion of the sheet material during stretching.

In many cases, it is necessary to heat the material to be stretched, especially when materials having a high crystallinity are to be stretched, prior to and/or during the stretching operation, and there are advantageously provided heating means, for example, an oven, arranged to heat a gas including the divergent portions of the guide means, and the grippers and the rotatable members thereon. It may also be necessary to anneal the stretched material prior to its release by the grippers and also to cool it and therefore an annealing zone and a cooling zone are advantageously provided at the end of the stretching zone. In order that the rotatable members shall rapidly reach thermal equilibrium when an oven is used, they are preferably formed as wheels which have apertures in the surface between the ridges or grooves. In the limiting case, the rotatable members may comprise a hub having a plurality of radiating arms, with or without a rim.

What is claimed is:

1. An apparatus for effecting the simultaneous biaxial stretching of sheet material comprising two spaced sets of moveably supported grippers, each of said sets adapted to grip one of two opposing marginal portions of the sheet material to be stretched, each gripper having a projecting portion for engagement with driving means; guide means, for each set of grippers, arranged to define spaced paths which diverge over at least a part of their length to provide a stretching zone between said means and to constrain the grippers to movement therealong; means for moving the grippers to the stretching zone at the end where said paths diverge; means for causing the grippers to grip said marginal portions before the grippers enter the stretching zone; means for causing the grippers to release the marginal portions after the material has passed through the stretching zone; driving means associated with each set of grippers for moving the grippers along said paths through the stretching zone; each driving means including a rotatable member formed with an array of generally coplanar ridges for engaging the projecting portions of the grippers, the plane of the ridges being substantially normal to the axis of rotation of the rotatable member, the ridges extending outwardly from the vicinity of said axis to terminate at their outer ends on a circle centered on said axis and being equally spaced therearound; each array of ridges being disposed in spaced overlapping relationship with the associated guide means so that at least a segment of the defined path thereof, including at least part of the diverging path, crosses succeeding ridges at ever increasing distances from the axis thereof; means for engaging the projecting portions of each set of grippers singly with the associated driving means while the grippers are situated along the path segment defined by each guide means; means for rotating each driving means to urge the ridges of each member against the engaging projecting portions to move the grippers along the path segments and thus outwardly along the diverging paths, at increasing speed along at least a portion thereof, through the stretching zone to biaxially stretch the sheet and means for recovering the stretched sheet.

2. The apparatus of claim 1 wherein the path segments defined by the guide means diverge along their entire length.

3. The apparatus of claim 1 wherein the ridges and grooves of each rotatable member are substantially straight.

4. The apparatus of claim 1 wherein the ridges and grooves of each rotatable member are curved.

5. The apparatus of claim 1 wherein the diverging paths of said guide means are substantially straight.

6. The apparatus of claim 1 wherein the diverging paths of said guide means are curved.

7. The apparatus of claim 1 wherein each guide means comprises an endless track and means are provided for moving the grippers around said track from the exit of said stretching zone to the entrance thereof.

8. The apparatus of claim 1 wherein the grippers have resiliently mounted projecting portions.

9. The apparatus of claim 1 wherein the rotatable member comprises a disc having a plurality of ridges therein defining grooves therebetween.

References Cited by the Examiner

UNITED STATES PATENTS

| | | | |
|---|---|---|---|
| 2,571,355 | 10/1951 | Gardner | 264—289 |
| 2,923,966 | 2/1960 | Tooke et al. | 18—1 |
| 2,988,772 | 6/1961 | Horn | 18—1 |
| 3,014,234 | 12/1961 | Koppehele | 18—1 X |
| 3,150,433 | 9/1964 | Kampf | 18—1 X |
| 3,172,151 | 3/1965 | Glossmann | 18—1 |

WILLIAM J. STEPHENSON, *Primary Examiner.*